(12) United States Patent
Bichler (10) Patent No.: US 9,581,280 B2
(45) Date of Patent: *Feb. 28, 2017

(54) MEANS FOR THE REHABILITATION OF A CONNECTING PORTION BETWEEN A MAIN PIPELINE AND A BRANCH PIPELINE, METHOD FOR THE REHABILITATION OF A CONNECTING PORTION AND REHABILITATION SYSTEM FOR THE REHABILITATION OF A CONNECTING PORTION

(71) Applicant: Trelleborg Pipe Seals Duisburg GMBH, Duisburg (DE)

(72) Inventor: Andreas Bichler, Ebbs/Tirol (AT)

(73) Assignee: TRELLEBORG PIPE SEALS DUISBURG GMBH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,797

(22) Filed: Mar. 30, 2016

(65) Prior Publication Data
US 2016/0208976 A1 Jul. 21, 2016

Related U.S. Application Data

(63) Continuation of application No. 14/461,509, filed on Aug. 18, 2014, now Pat. No. 9,347,212.

(51) Int. Cl.
| | |
|---|---|
| *F16L 55/16* | (2006.01) |
| *F16L 55/165* | (2006.01) |
| *E03F 7/12* | (2006.01) |
| *F16L 55/179* | (2006.01) |
| *F16L 55/18* | (2006.01) |
| *G01L 7/00* | (2006.01) |
| *G01K 1/00* | (2006.01) |
| *E03F 3/06* | (2006.01) |

(52) U.S. Cl.
CPC .............. *F16L 55/165* (2013.01); *E03F 7/12* (2013.01); *F16L 55/1651* (2013.01); *F16L 55/179* (2013.01); *F16L 55/18* (2013.01); *G01K 1/00* (2013.01); *G01L 7/00* (2013.01); *E03F 2003/065* (2013.01)

(58) Field of Classification Search
CPC ... F16L 55/1653; F16L 55/1651; F16L 55/18; F16L 55/179; F16L 9/14
USPC ....... 138/98, 97; 264/269, 267, 516; 156/94, 156/287, 294, 574
See application file for complete search history.

(56) References Cited

U.S. PATENT DOCUMENTS

| | | | | | |
|---|---|---|---|---|---|
| 5,950,682 | A | * | 9/1999 | Kiest, Jr. ................. | B29C 63/36 138/97 |
| 6,039,079 | A | * | 3/2000 | Kiest, Jr. ................. | B29C 63/36 138/97 |
| 6,942,426 | B1 | * | 9/2005 | Kampbell ........... | F16L 55/1654 138/97 |

(Continued)

*Primary Examiner* — Patrick F Brinson
(74) *Attorney, Agent, or Firm* — Dickinson Wright PLLC (57) ABSTRACT

A means for the rehabilitation of a connecting portion between a main pipeline and a branch pipeline with a main pipe section and a branch pipe section, wherein the main pipe section has a connecting region, wherein the branch pipe section is connected at its first end portion to the connecting region of the main pipe section, wherein the branch pipe section is closed at its second end portion and wherein at least one contactless sensor is disposed within the means.

13 Claims, 2 Drawing Sheets

(56) References Cited

U.S. PATENT DOCUMENTS

| | | | |
|---|---|---|---|
| 8,801,329 B2* | 8/2014 | Bateman | F16L 55/165 138/97 |
| 8,844,577 B2* | 9/2014 | Kiest, Jr. | F16L 55/1653 138/104 |
| 2005/0200037 A1* | 9/2005 | Sanders | B08B 9/0553 264/36.17 |
| 2012/0007714 A1* | 1/2012 | Muhlin | F16L 55/1653 340/10.1 |
| 2014/0027000 A1* | 1/2014 | Kiest, Jr. | F16L 55/1653 138/97 |
| 2014/0048151 A1* | 2/2014 | Bichler | F16L 55/1654 137/315.01 |

* cited by examiner

MEANS FOR THE REHABILITATION OF A CONNECTING PORTION BETWEEN A MAIN PIPELINE AND A BRANCH PIPELINE, METHOD FOR THE REHABILITATION OF A CONNECTING PORTION AND REHABILITATION SYSTEM FOR THE REHABILITATION OF A CONNECTING PORTION

CROSS-REFERENCE TO RELATED APPLICATIONS

The present application is continuation of application Ser. No. 14/461,509, filed 18 Aug. 2014, and through which priority is claimed to German Patent Application No. 10 2014 109 074.8, filed 27 Jun. 2014, the disclosures of the which are incorporated herein by reference in their entireties.

FIELD OF THE INVENTION

The present invention relates to a means for the rehabilitation of a connecting portion between a main pipeline and a branch pipeline. Furthermore, the invention relates to a method for the rehabilitation of a connecting portion between a main pipeline and a branch pipeline and a rehabilitation system for the rehabilitation of a connecting portion between a main pipeline and a branch pipeline.

BACKGROUND

Means of the type mentioned above are used in the rehabilitation of pipelines, in particular of main pipelines and branch pipelines, in the area of the sewerage system. By inserting such means, leaking and defective sections of pipelines, and in particular of pipeline joint portions, can be rehabilitated. In this case, the means can be configured as a lining element and/or as a calibrating tube.

A means configured as a calibrating tube of the type mentioned above has a main pipe section or main pipe calibrating tube and a branch pipeline section or branch pipeline calibrating tube, which are configured to be expansible and inflatable. In the inflated state, the calibrating tube has the approximate size and shape of the pipe section to be rehabilitated. Furthermore, the branch pipe calibrating tube is disposed at an angle to the main pipe calibrating tube, with this angle matching the angle between the house connection pipe and a main pipe. In order to rehabilitate the mouth region, the calibrating tube is pushed onto a device for rehabilitating the pipelines, which is also referred to as a packer. In the process, the calibrating tube is fastened at each end to the packer by means of clamping collars, so that an air-tight connection is produced. Furthermore, a resin-impregnated lining element is provided. Then, the branch pipe calibrating tube is inverted into the main pipe calibrating tube together with the liner. For this purpose, the free end of the branch pipe calibrating tube is provided with a rope. At the same time, the air in the main pipe calibrating tube and in the branch pipe calibrating tube is suctioned off. Then, the packer is moved to the mouth region to be rehabilitated. Subsequent to positioning, the main pipe calibrating tube is inflated and the branch pipe calibrating tube with the liner is inverted, i.e. folded over, into the house connection. Inversion is carried out using a rope or cable pulling device attached to the outside of the free end of the branch pipe calibrating tube. As a consequence of the inversion, the lining element is pressed against the site to be rehabilitated. After the liner has hardened, the air is let out of the calibrating tube, and the device is moved out of the main pipe. The hardened lining element then rests against the inner wall of the pipeline with a substance-to-substance connection.

A means of the type mentioned in the introduction, which is configured as a lining element and can also be referred to as a liner, comprises a substrate layer of resin-absorbing material, in particular a non-woven or fiber material. Prior to the insertion of the lining element, the layer consisting of the resin-absorbing material is impregnated with the resin, and then the lining element is brought by means of a rehabilitation device, which can also be referred to as a packer, into its final position at the site to be rehabilitated. The above-described inversion process, or also eversion process, is then used for pressing on the lining element. A calibrating tube as described above can be used for pressing the lining element against the inner pipe wall. Moreover, the lining element can be pressed against the inner pipe wall also without using a calibrating tube. After the resin has hardened, the lining element rests against the inner pipe wall with a substance-to-substance connection.

Hardening takes place by charging the means with a medium, in particular hot vapor, in order to trigger the external reaction process of the resin. For an optimal installation result, it is necessary to detect and evaluate the pressure required for pressing and/or the temperature required for hardening the resin, in order to increase or reduce the temperature and/or the increase or reduce the pressure, if necessary. In order to detect the above-mentioned physical parameters, it is known to provide the means with a sensor.

For example, a lining element is shown in U.S. Pat. No. 6,942,426 B1, which is provided with a plurality of temperature feelers that measure the temperature at the interface between the outer face of the lining element and the inner face of the pipe wall during hardening in order thus to determine the hardening temperature.

Furthermore, it is known from WO 2014/022097 A1 to provide the lining element with a transmitter comprising an RFID chip and a sensor. Among other things, the pressure and temperature during the hardening process can be measured by means of the sensor. In this case, the transmitter is applied to the lining element in such a way that it rests on the interface between the outer face of the lining element and the inner face of the pipe.

The lining element or sensors used for measuring pressure and temperature known from the prior art are contact-sensitive sensors. Thus, a contact between the lining element and the inner pipe wall is always required for the measurements. Consequently, the temperature and the pressure for hardening the medium are measured only on the outer face of the lining element. Thus, the temperature and the pressure of the medium used for hardening can only be determined indirectly. Consequently, the exact adjustment of the physical parameters of the medium is made difficult. In addition, the sensors remain in the pipeline to be rehabilitated after hardening, and therefore cannot be reused.

SUMMARY

All of the "lining elements" mentioned in the present invention can also be referred to as liners, rehabilitation elements or pipe liner elements. In principle, such a lining element can have a single-part or multi-part configuration.

Moreover, the "rehabilitation device" referred to in the present invention can also be referred to as a device for rehabilitation or packer.

The inventive means according to claim 1 serves for the rehabilitation of a connecting portion between a main pipeline and a branch pipeline. The connecting portion can also be referred to as a branch-off site. The means according to the invention comprises a main pipe section and a branch pipe section, wherein the main pipe section has a connecting region, wherein the branch pipe section is connected at its first end portion to the connecting region of the main pipe section. The branch pipe section is closed at its second end portion. At least one contactless sensor is disposed within the means. The closed end of the branch pipe section is preferably made from the same material as the branch pipe section. Furthermore, the second end portion and the branch pipe section can be formed as a single piece or from several pieces of material.

According to the invention, it was found that a contactless sensor disposed within the means enables an improved measurement of the physical parameters of the medium used for hardening because the sensor is in direct contact with the medium to be measured. Consequently, there is no intermediate layer between the sensor and the medium that affects and/or distorts the measurement. Thus, the temperature, the pressure and/or the flow-through can be measured and evaluated directly. Thus, the physical parameters of the medium used for hardening can be adjusted and/or adapted precisely. In addition, the sensor can be reused after hardening because it is disposed within the means. For this purpose, the sensor can be connected to a pulling device by means of which the sensor can be removed again from the means after hardening.

In an advantageous embodiment, the sensor is disposed within the branch pipe section. This is advantageous particularly if the branch pipeline to be rehabilitated has a great length.

Advantageously, the sensor is connected to the second end portion. In this case, the sensor may be inserted into the second end portion. Furthermore, the sensor can be connected to the second end portion via a tube.

Advantageously, the sensor is configured to measure the following physical parameters: pressure, flow rate of the medium and/or temperature of a medium flowing through the means. The temperature can be measured by means of a laser and/or by means of infrared. In order to measure the pressure and the flow rate, the sensor is disposed within the means in such a way that the medium flows through the sensor. Preferably, air, water vapor and/or water are used as the means.

The sensor can be configured to convert the measured parameters into radio signals and transmit them to an evaluation device. In this case, the sensor is capable of transmitting the radio signals to the evaluation device wirelessly. The evaluation device is advantageously configured as a data processing system, such as, for example, a PC. Advantageously, the measured parameters are digitally evaluated by means of the evaluation device. Moreover, the measured parameters, particularly the digitally evaluated parameters, can be stored by means of the evaluation device on a storage medium, such as, for example, on an SD chip and/or in a cloud. In addition, the measured parameters can be transmitted online by means of the evaluation device.

In an advantageous embodiment, the sensor transmits the signals to a receiver. The latter converts the radio signals sent by the sensor into electrical signals and transmits them to the evaluation device. The transmission of the electrical signals to the evaluation device can be carried out by means of a cable. Advantageously, the receiver is disposed on a rehabilitation device.

In an advantageous embodiment, a valve, in particular an outlet valve, is disposed in the second end portion. In case of overpressure, medium can be discharged from the means by means of the valve. The valve is configured in such a way that it closes again automatically when the pressure required for pressing on the means is reached. Thus, it is no longer necessary to check the maximum pressure. Advantageously, the valve is configured as an overpressure valve.

In an advantageous embodiment, the sensor is connected to the valve. For this purpose, the sensor can be connected to the valve by means of a tube. Thus, the medium flows from the sensor via the tube to the valve, which then automatically opens and closes in case of overpressure. Furthermore, the valve can also be configured as a controllable valve. Depending on the pressure measured, the valve is controlled to open or close accordingly. In an advantageous embodiment, the sensor is integrated in the valve.

In another advantageous embodiment, at least one pulling means connecting device is attached to the valve. Advantageously, a first end of the valve and a second end of the valve are each provided with a pulling means connecting device. Using this pulling means connecting device, it is possible to invert the means into the house connection pipe. For this purpose, a rope or cable pulling device is attached to the pulling means connecting device. By pulling on the rope or the cable pulling device, the branch pipe calibrating tube is inverted into the house connection pipe. Furthermore, a pulling means connecting device disposed on the inside of the branch pipe section can serve for inverting the branch pipe section into the main pipe section. For this purpose, a rope is attached to the inwardly protruding pulling means connecting device.

In an advantageous embodiment, the second end portion is closed with an end cap that can be pulled off. The end cap can be connected to the branch pipe section via a detachable connection means. In this case, the detachable connection means can be configured as a zipper and/or a Velcro fastener. Furthermore, the removable end cap can be glued and/or sewed to the branch pipe section. In order to detach the connection means, the end cap can be connected to a pulling device.

In an advantageous embodiment, the means is configured as a lining element. The lining element is formed from an expansible, resin-absorbing substrate layer of fiber material. It is further preferred that the substrate layer is formed from a non-woven fabric of ECR glass fibers. In another advantageous embodiment, the substrate layer is formed from a non-woven fabric, the non-woven fabric comprising a mixture of ECR glass fibers and synthetic fibers, preferably polyester fibers. The ECR glass fibers are preferably fibers with an increased corrosion resistance (ECR: E-Glass Corrosion Resistant). Preferably, the ECR glass fibers and the synthetic fibers, preferably the polyester fibers, are needled to each other. Moreover, other glass fibers or other fibers may also be used. Alternatively or additionally, the substrate layer can comprise polyester fibers, polypropylene fibers, carbon fibers, basalt fibers and/or aramid fibers. In principle, polyester needle-punched non-wovens, glass fiber mats and thermoplastic plastic fibers, for example PP, PES, carbon fibers or aramid fibers and combinations of the aforementioned constituents can also be used. Due to the fibrous structure, the substrate layer can be impregnated with a resin, in particular an epoxy resin. Particularly preferably, the substrate layer is formed as a Multiknit non-woven or Kunit non-woven. A Multiknit or Kunit substrate layer makes possible, in particular, a good radial expansibility and an expansibility in the longitudinal direction.

Preferably, the mixing ratio of ECR glass fibers to polyester fibers is in a range of between approx. 90% by wt. ECR glass fibers and approx. 10% by wt. polyester fibers to between 10% by wt. ECR glass fibers and approx. 90% by wt. polyester fibers, preferably in the range of between approx. 85% by wt. ECR glass fibers and approx. 15% by wt. polyester fibers to between approx. 15% by wt. ECR glass fibers and approx. 85% by wt. polyester fibers.

In an advantageous embodiment, the substrate layer has a thickness of between approx. 2 mm and approx. 6 mm, preferably between approx. 3 mm and approx. 5 mm. Further, the substrate layer advantageously has a weight per unit area of between approx. 300 g/m$^2$ and approx. 1000 g/m$^2$, preferably between approx. 400 g/m$^2$ and approx. 900 g/m$^2$.

In an advantageous embodiment, the lining element can comprise a multiple layer system in addition to the substrate layer. The multiple layer system is advantageously formed from several individual thin layers, which may also be referred to as plies. In this case, the multiple layer system can be formed from silicone or from thermoplastic polyurethane. In this case, the multiple layer system serves as a vapor barrier and as a resin barrier layer, particularly as an epoxy resin barrier layer. Consequently, the multiple layer system makes a sufficient tightness of the lining element possible. In combination with an end cap that can be pulled off, a calibrating tube is no longer required for inverting, pressing and/or hardening. In an advantageous embodiment, the multiple layer system has an expansion layer, a barrier layer and/or an anti-friction layer of silicone or of thermoplastic polyurethane. Advantageously, the multiple layer system points into the interior of the pipe in the installed state. Preferably, the multiple layer system is extremely flexible and/or expansible, so that the lining element is capable of adapting optimally to the course of the pipeline, particularly to curves, bends and changes in nominal width in the pipeline. Due to the multiple layer system, the lining element is moreover capable of adapting to the curves and bends in the pipeline, if possible without the formation of creases. In addition, the multiple layer system also serves as a protective layer against abrasion and/or damage caused by the substances transported with the waste water or rain water. Furthermore, it serves as a chemical protective layer against chemical reactions of the waste water and/or the transported substances. Moreover, it is capable of preventing the resin from being washed out of the substrate layer.

In a preferred embodiment, the substrate layer can be provided with a foam layer. In this case, the foam layer can be connected to the substrate layer by means of an adhesive layer or by laminating. Preferably, the foam layer is an open-cell or open-pore foamed material. Advantageously, the at least one foam layer is also actively at least partially impregnated with the resin when the lining element is impregnated. The resin is deposited in the pores of the foamed material structure. When the lining element is then brought to the site to be rehabilitated and is connected to the inner pipe wall as intended, the lining element is pressed against the inner pipe wall. In the process, the pore structure changes. The pores, which previously had an approximately circular shape, become elongated or ellipsoidal by being pressed together, whereby the resin is able to disperse also into adjacent pores that have initially not been completely filled with resin. In this state of the lining element being pressed against the inner pipe wall, further pores are thus filled with resin. The resin then glues the pore structure together and forms a substantially fluid-tight protective layer.

In an advantageous embodiment, the lining element is formed from at least three lining parts interconnected by at least three connections in order to form the lining element. It is further preferred that the number of connections is equal to the number of the lining parts. It is further advantageous that the respective connection is formed by a seam and/or adhesive connection extending substantially along the adjacent lateral edges of the lining parts. Preferably, this connection extends continuously from the one end of the lining element to the other end of the lining element. Thus, this may also be referred to as a longitudinal connection or a longitudinal seam.

In a preferred embodiment, the lining parts are connected to each other by the lateral edges of the adjacent branch pipe sections as well as the lateral edges of adjacent main pipe sections both being continuously connected to each other. A continuous connection can thus be obtained. The lateral edge sections of adjacent branch pipe sections and the lateral edge sections of adjacent main pipe sections can be respectively connected to each other. Particularly if these sections are configured in a straight manner, the lateral edge sections can simply be sewed and/or glued together.

Furthermore, the branch pipe sections can be connected by means of at least one connection to a branch pipe extension that comprises at least one flexible, expansible lining part. The branch pipe can be, for example, a house connection pipe. In the installed state, the branch pipe extension rests against the branch pipe and can have a length of, for example, approximately up to 20 m or more. Preferably, the branch pipe extension is provided with a contactless sensor. Further, it is advantageous if the branch pipe extension is provided with an end cap that can be pulled off.

In an advantageous embodiment, the means is configured as a calibrating tube. A lining element is pressed against the inner pipe wall by means of the calibrating tube by the latter being charged with a medium. After a lining element has hardened, the medium is discharged from the calibrating tube and the latter is removed from the pipeline. The calibrating tube is pushed onto a rehabilitation device, which is also referred to as a device for rehabilitation or packer. In the process, the calibrating tube is also fastened at each end to the packer by means of clamping collars, so that an air-tight connection is produced. The branch pipe section is preferably formed from the same material as the main pipe section and, as a further preference, as a single piece therewith. Furthermore, the branch pipe section of the calibrating tube can be connected to the main pipe section via a detachable connection means. In this case, the detachable connection means can be configured as a zipper and/or as a Velcro fastener. Furthermore, the branch pipe section can also be glued and/or sewed to the main pipe section. Moreover, the connection means can comprise several connection units. In this case, a first connection unit can be attached to the end portion of the branch pipe section, and a second connection unit can be attached in the region of the main pipe section. It is also possible that the main pipe section is provided with several connection units, so that different branch pipe sections can be connected, for example at different angles. Advantageously, the branch pipe section and/or the main pipe section comprise at least one sealing lip that covers the detachable connection means at least partially. In case of a defective detachable connection means, the sealing lip ensures that no air can escape, so that the required press-on pressure can be maintained in spite of a defective connection means. Furthermore, the sealing lip protects the connection means from damage and/or dirt.

Advantageously, the connection means or at least one of the connection means is surrounded by an inner and an outer sealing lip.

As a further advantage, the main pipe section and/or the branch pipe section of the means configured as a calibrating tube comprises at least one reinforcing member, in particular a fabric strip. The fabric strip ensures that particularly the main pipe section is not damaged in the bottom region by rigid or movable elements of the packer.

In another advantageous embodiment, the main pipe section and/or the branch pipe section of the means formed as a calibrating tube comprise a fabric ply and at least one plastic coating. As a consequence of the combination of a fabric ply with a plastic coating, the calibrating tube has the properties of sufficient tightness, expansibility and durability required for use in the rehabilitation of pipelines. The fabric is preferably a textile ply. Silicone is preferably used as the plastic coating.

The present invention additionally relates to a method for the rehabilitation of a connecting portion between a main pipeline and a branch pipeline with a means according to the invention, which comprises the following steps: First, a means is transported to the connecting portion to be rehabilitated, with the means comprising at least one contactless sensor. Then, the means is inverted, pressed on and/or hardened against the inner pipe wall by means of a medium. During inversion, pressing and/or hardening, the physical parameters of the medium are measured by means of the sensor. Finally, the measured parameters are transmitted to an evaluation device. The measured parameters can be transmitted wirelessly via radio and/or by means of a cable to the evaluation device. The measured parameters can then be digitally evaluated by means of the evaluation device. Preferably, the means is transported by means of a rehabilitation device to the connecting portion to be rehabilitated. In an advantageous embodiment, the sensor measures the pressure, the temperature and/or the flow rate of the medium. Preferably, air, water vapor and/or water are used as the medium.

In an advantageous embodiment, the sensor transmits the measured parameters to a receiver disposed on a rehabilitation device. For this purpose, the sensor converts the measured parameters into radio signals and transmits them to the receiver.

As a further advantage, the receiver transmits the transmitted parameters to the evaluation device. For this purpose, the receiver converts the radio signals of the sensor into electrical signals, which it transmits to the evaluation device via a cable.

In an advantageous embodiment, the measured parameters are stored on a storage medium. Preferably, the parameters are stored on an SD chip and/or in a cloud. Moreover, the measured parameters can also be transmitted online by means of the evaluation device for logging purposes. The measured parameters are stored by means of the evaluation device.

Furthermore, the present invention relates to a rehabilitation system for the rehabilitation of a connecting portion between a main pipeline and a branch pipeline with a means according to the invention, a rehabilitation device and an evaluation device.

BRIEF DESCRIPTION OF THE DRAWINGS

The means according to the invention, the method according to the invention and the rehabilitation system according to the invention are explained in more detail below with reference to the attached drawings. The Figures schematically show.

WRITTEN DESCRIPTION

Figure 1:
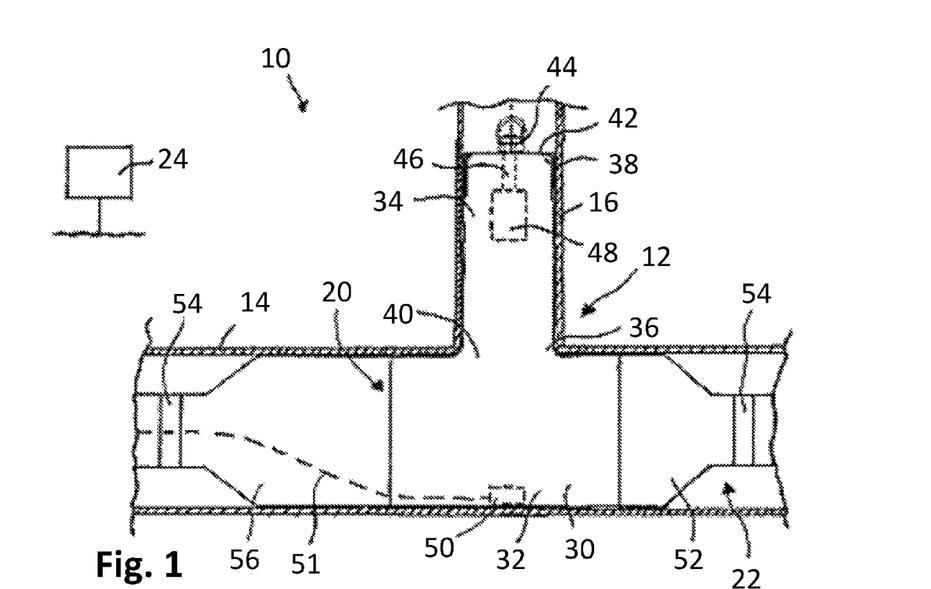
FIG. 1 shows a schematic view of the rehabilitation system according to the invention with an inventive means according to a first embodiment in the mouth region of a main pipeline and a branch pipeline.
Figure 3:
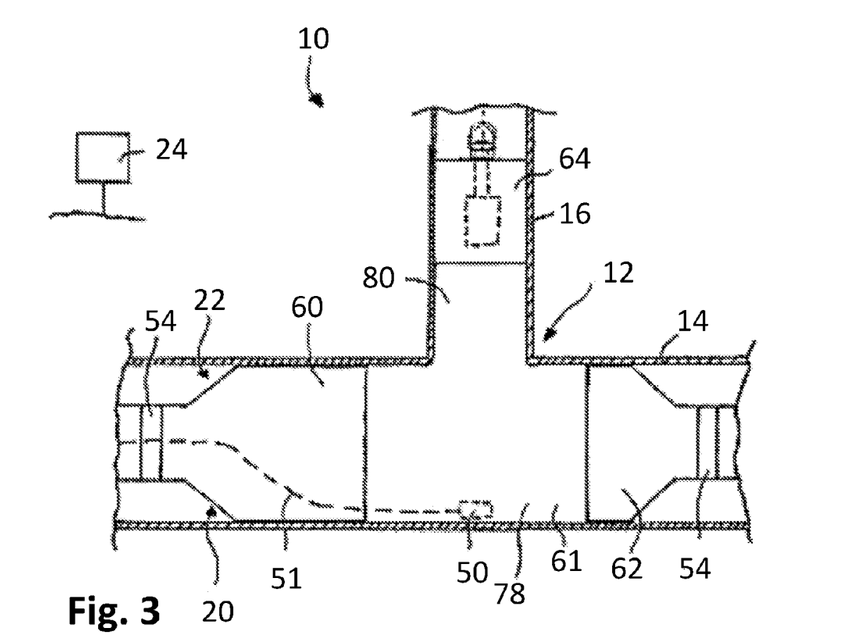
FIG. 3 shows a schematic view of the rehabilitation system according to the invention with an inventive means according to a second embodiment in the mouth region of a main pipeline and a branch pipeline.

FIGS. 1 and 3 show a rehabilitation system 10 according to the invention with a means 20 according to the invention for the rehabilitation of a connecting portion 12 between a main pipeline 14 and a branch pipeline 16, which can also be referred to as a house connection pipe. In order to rehabilitate the connecting portion 12, the means 20 is charged by means of a medium, so that the means is inverted into the main pipeline 14 and/or the branch pipeline 16 and pressed against the inner wall thereof. Preferably, air, water vapor and/or water are used as the medium.

In addition to the means 20 according to the invention, the rehabilitation system 10 comprises a rehabilitation device 22, which can also be referred to as a packer, and an evaluation device 24.

Figure 2:
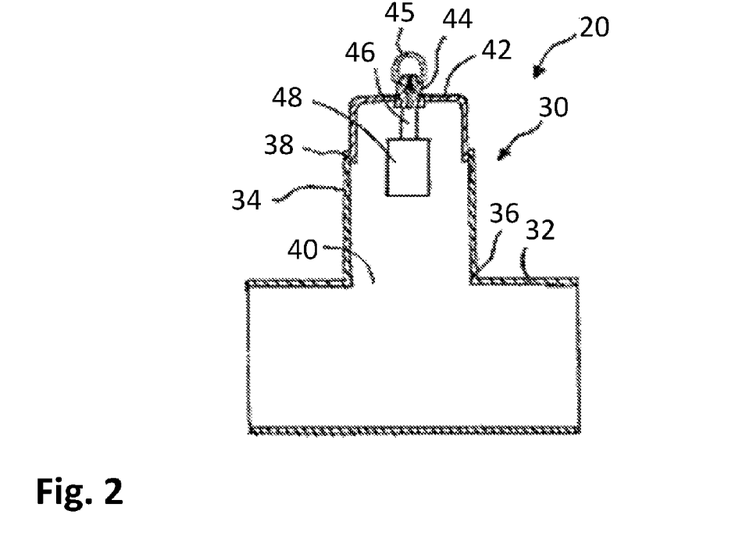
FIG. 2 shows a vertical section through the inventive means according to the first embodiment.

As is apparent from FIGS. 1 and 2, the means 20 according to the first embodiment is configured as a lining element 30. The lining element 30 is configured to be approximately T-shaped and rests against the inner wall of the pipeline in the installed state. The lining element 30 is configured as a single piece and has a substrate layer of a continuous layer of fiber material. In particular, the substrate layer is formed as a Multiknit non-woven or Kunit non-woven and comprises a plurality of interwoven polyester fibers and/or glass fibers. The substrate layer can be impregnated with a hardenable resin and, in the hardened state, rests against the site to be rehabilitated. Prior to the insertion of the lining element 30 into the pipeline, the substrate layer is impregnated with a resin. Moreover, the substrate layer can be provided with a coating system of several interconnected layers or plies, which is not shown. The individual layers or plies can be formed from silicone or thermoplastic polyurethane. In the installed state, the coating points into the interior of the pipe.

According to an embodiment that is not shown, the lining element 30 can be formed from several lining parts that are interconnected. Such lining parts are disclosed in WO 2011/104357 A3, whose content of disclosure is thus incorporated into the present application.

The lining element 30 has a tubular main pipe section 32 and a tubular branch pipe section 34. The branch pipe section 34 has a first end portion 36 and a second end portion 38, the first end portion 36 being connected with a substance-to-substance connection and/or sewed to the main pipe section 32 in the region of an opening 40 introduced into the main pipe section 32. The second end portion 38 is closed with an end cap 42 that can be pulled off. The end cap 42 that can be pulled off is connected with a substance-to-substance connection to the branch pipe section 34 and/or sewed thereto. In the present case, the end cap 42 that can be pulled off is glued to the branch pipe section 34.

As is apparent particularly from FIG. 2, the end cap 42 that can be pulled off has a valve 44 which serves for regulating the pressure within the lining element 30. In this case, the valve 44 is configured as an outlet valve, in particular as an overpressure valve. In case of overpressure, the medium can be discharged from the lining element 30 by means of the valve 44 during the inverting, pressing and/or hardening. If, in case of an overpressure, the pressure required for pressing on the lining element 30 is reached again after the valve 44 has been opened, the valve 44 closes again automatically.

The valve 44 is connected to a contactless sensor 48 via a tube 46. The following physical parameters of the medium can be measured by means of the sensor 48 for inverting, pressing on and/or hardening the lining element 30: the pressure, the temperature and/or the flow rate. Preferably, air, water vapor and/or water are used as the medium for inverting, pressing and/or hardening. In order to measure the flow rate and the pressure, the medium flows through the sensor 48. Through the tube 46, the medium flows to the valve 44, so that the medium is discharged in case of an overpressure. The temperature is measured by means of laser or infrared.

In an embodiment which is not shown, the sensor 48 can be integrated into the valve 44.

The sensor 48 converts the measured values or the measured physical parameters into radio signals and transmits them to a receiver 50 disposed on the rehabilitation device 22. The receiver 50 converts the radio signals into electrical signals and transmits them to the evaluation device 24 located on the surface via a cable 51. The evaluation device 24 is configured as a PC, so that the transmitted measured values can be digitally evaluated and stored on a storage medium. In this case, an SD chip or a cloud service may serve as the storage medium. Moreover, the measured values can also be transmitted online by means of the evaluation device 24 for logging purposes.

A possible method for the rehabilitation of a connecting portion by means of the rehabilitation system 10 according to the invention and the means 20 according to the invention, which is configured as a lining element 30, is described below. For this purpose, a calibrating tube 52 is pushed onto the packer 22, with the calibrating tube 52 being fastened at each end to a cylindrical connecting member of the packer 22 by means of clamping collars 54, so that an air-tight connection is produced, as is shown in FIG. 1. Since the means 20 according to the invention, or the lining element 30, is provided with an end cap 42 that can be pulled off, no calibrating tube is required for inverting, pressing on and/or hardening the branch pipe section 34, so that the calibrating tube 52 is formed only of a main pipe section or main pipe calibrating tube 56. Then, a resin-impregnated lining element 30 is pushed onto the calibrating tube 52. In the pushed-on state, the main pipe section 32 surrounds the calibrating tube 52, and the branch pipe section 34 is disposed outside the calibrating tube 52. Then, the calibrating tube 52 is inflated in order to check its tightness. Then, the air is discharged from the calibrating tube 52 and the branch pipe section 34 is inverted into the interior of the calibrating tube 52 via a pulling means which is not shown, such as a rope that is connected to the valve 44 and disposed within the lining element 30. Subsequent thereto, the packer 22 is moved to the connecting portion 12 to be rehabilitated in such a way that the branch pipe section 34 can be inverted into the branch pipe 16. After the exact positioning, the calibrating tube 52 is pressurized, and at the same time, the branch pipe section 20 is inverted into the house connection pipe 16 by means of a pulling means, which is not shown and attached to the end cap 42 that can be pulled off, such as a rope or a cable pulling device connected to a pulling means connecting device 45 of the valve 44. Because of the calibrating tube 52 being charged with a medium, the lining element 30 is pressed against the connecting portion 12, the main pipeline 14 and the branch pipeline 16 and/or hardened. During this process, the temperature, the pressure and/or the flow rate of the medium are measured by means of the sensor 48. In the process, the sensor 48 converts the measured values into radio signals and transmits them to the receiver 50 disposed on the packer 22. In turn, the receiver 50 converts the radio signals into electrical signals and transmits them to the evaluation device 24 located on the surface via the cable 51. The measured values can then be digitally evaluated by means of the evaluation device 24. It is thus possible to change, adapt and/or adjust the temperature, the pressure and/or the flow rate of the medium. After the lining element 30 has hardened, the air is discharged from the calibrating tube 52. Moreover, the end cap 42 that can be pulled of is removed, together with the valve 44 and the sensor 48, from the branch pipe section 34 by means of the pulling means disposed within the lining element, and pulled into the calibrating tube 52. Then, the packer 22 is removed from the main pipe 14.

In the present case, the lining element 30 has a tubular main pipe section 32. However, the main pipe section 32 can also be configured with a hat-brim shape. Such a lining element is disclosed in WO 2011/104357 A3, whose content of disclosure is thus incorporated into the present application.

Figure 4:
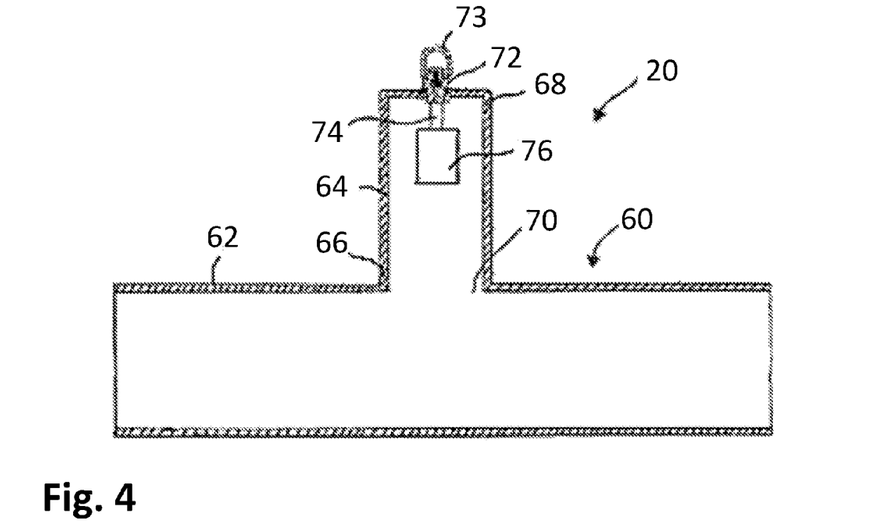
FIG. 4 shows a vertical section through the inventive means according to the second embodiment.

FIGS. 3 and 4 disclose an inventive means 20 according to a second embodiment. The means 20 is configured as a calibrating tube 60 that serves for pressing a lining element 61 shown in FIG. 3 against the inner pipe wall. In the present case, the calibrating tube 60 is configured as a single piece and has a tubular main pipe section 62 and a tubular branch pipe section 64. The main pipe section 62 can also be referred to as main pipe calibrating tube and the branch pipe section 64 can also be referred to as branch pipe calibrating tube. The branch pipe section 64 has a first end portion 66 and a second end portion 68, the first end portion 66 being connected with a substance-to-substance connection and/or sewed to the main pipe section 62 in the region of an opening 70 introduced into the main pipe section 62. In the present case, the branch pipe section 64 projects from the main pipe section 62 at an angle of about 90°. The branch pipe section 64 can also project from the main pipe section 62 at a different angle. The branch pipe section 64 is closed at its second end portion 68.

According to an embodiment not shown, the branch pipe section 64 can be connected to the main pipe section 62 via a detachable connection means. Such calibrating tube are disclosed in DE 10 2011 075 404 B4, whose content of disclosure is thus incorporated into the present application.

As is apparent particularly from FIG. 4, the second end portion 68 has a valve 72 which serves for regulating the pressure within the calibrating tube 60. In this case, the valve 72 is configured as an outlet valve, in particular as an overpressure valve. In case of overpressure, the medium can be discharged from the calibrating tube 60 by means of the valve 72 during the inverting, pressing on and/or hardening of the lining element 61. If, in case of an overpressure, the pressure required for pressing on the lining element 61 is reached again after the valve 72 has been opened, the valve 72 closes again automatically.

The valve 72 is connected to a contactless sensor 76 via a tube 74. The following physical parameters of the medium can be measured by means of the sensor 76 for inverting, pressing on and/or hardening the lining element 61: the pressure, the temperature and/or the flow rate. Preferably, air, water vapor and/or water are used as the medium for inverting, pressing and/or hardening. In order to measure the flow rate and the pressure, the medium flows through the sensor 76. Through the tube 74, the medium flows to the valve 72, so that the medium is discharged in case of an overpressure. The temperature is measured by means of laser or infrared.

In an embodiment which is not shown, the sensor 76 can be integrated into the valve 72.

The sensor 76 converts the measured values or the measured physical parameters into radio signals and transmits them to a receiver 50 disposed on the rehabilitation device 22. The receiver 50 converts the radio signals into electrical signals and transmits them to the evaluation device 24 located on the surface via a cable 51. The evaluation device 24 is configured as a PC, so that the transmitted measured values can be digitally evaluated and stored on a storage medium. In this case, an SD chip or a cloud service may serve as the storage medium. Moreover, the measured values can also be transmitted online by means of the evaluation device 24 for logging purposes.

A possible method for the rehabilitation of a connecting portion by means of the rehabilitation system 10 according to the invention and the means 20 according to the invention, which is configured as a calibrating tube 60, will be explained below. For this purpose, the calibrating tube 60 is pushed onto the packer 22, with the main pipe section 62 being fastened at each end to a cylindrical connecting member of the packer 22 by means of clamping collars 54, so that an air-tight connection is produced, as is shown in FIG. 3. Then, a resin-impregnated lining element 61 comprising a main pipe section 78 and a branch pipe section 80 is pushed onto the calibrating tube 60. In the pushed-on state, the main pipe section 78 surrounds the main pipe section 62, and the branch pipe section 80 is disposed in the region of the branch pipe section 64 in such a way that the branch pipe section 64, in the inflated state, can extend through the branch pipe section 80, as shown in FIG. 3. Then, the calibrating tube 60 is inflated in order to check its tightness. Then, the air is discharged from the calibrating tube 60 and the branch pipe section 64 is inverted into the interior of the main pipe section 62 via a pulling means which is not shown, such as a rope that is connected to the valve 72 and disposed within the calibrating tube 60. Subsequent thereto, the packer 22 is moved to the connecting portion 12 to be rehabilitated in such a way that the branch pipe calibrating tube 64 can be inverted into the branch pipe 16. After the exact positioning, the calibrating tube 60 is pressurized, and at the same time, the branch pipe section 64 is inverted into the house connection pipe 16 by means of a pulling means, which is not shown, such as a rope or a cable pulling device connected to a pulling means connecting device 73 of the valve 72. Because of the calibrating tube 60 being charged with a medium, the lining element 61 is pressed against the connecting portion 12, the main pipe 14 and the branch pipe 16 and/or hardened. During this process, the temperature, the pressure and/or the flow rate of the medium are measured by means of the sensor 76. In the process, the sensor 76 converts the measured values into radio signals and transmits them to the receiver 50 disposed on the packer 22. In turn, the receiver 50 converts the radio signals into electrical signals and transmits them to the evaluation device 24 located on the surface via the cable 51. The measured values can then be digitally evaluated by means of the evaluation device 24. It is thus possible to change, adapt and/or adjust the temperature, the pressure and/or the flow rate of the medium. After the lining element 61 hardened, the air is discharged from the calibrating tube 60. Furthermore, the branch pipe section 64 is inverted into the main pipe section 62 by means of the pulling means disposed within the calibrating tube 60. Then, the packer 22 is removed from the main pipe 14.

The means 20 according to the invention is characterized particularly by its contactless sensor 48, 76, which is disposed within the means 20. This enables an improved measurement of the physical parameters of the medium used for hardening because the sensor 48, 76 is in direct contact with the medium to be measured. Thus, the temperature, the pressure and/or the flow-through can be measured directly. Thus, the physical parameters of the medium used for hardening can be adjusted and/or adapted precisely. In addition, the sensor 48, 76 can be reused after hardening.

REFERENCE SIGN LIST

10 Rehabilitation system
12 Connecting portion
14 Main pipeline
16 Branch pipeline
20 Means
22 Rehabilitation device
24 Evaluation device
30 Lining element
32 Main pipe section
34 Branch pipe section
36 First end portion
38 Second end portion
40 Opening
42 End cap that can be pulled off
44 Valve
45 Pulling means connecting device
46 Tube
48 Contactless sensor
50 Receiver
51 Cable
52 Calibrating tube
54 Clamping collars
56 Main pipe calibrating tube
60 Calibrating tube
61 Lining element
62 Main pipe section
64 Branch pipe section
66 First end portion
68 Second end portion
70 Opening
72 Valve
73 Pulling means connecting device
74 Tube
76 Contactless sensor
78 Main pipe section
80 Branch pipe section The invention in which an exclusive property or privilege is claimed is defined as follows:

1. A means for the rehabilitation of a connecting portion between a main pipeline and a branch pipeline with a main pipe section and a branch pipe section, wherein the main pipe section has a connecting region, wherein the branch pipe section is connected at its first end portion to the connecting region of the main pipe section, wherein the branch pipe section is closed at its second end portion and wherein at least one contactless sensor is disposed within the means.

2. The means according to claim 1, wherein the sensor is disposed within the branch pipe section.

3. The means according to claim 1, wherein the sensor is connected to the second end portion.

4. The means according to claim 1, wherein the sensor is configured to measure the following physical parameters: pressure, flow rate of the medium and/or temperature of a medium flowing through the means.

5. The means according to claim 1, wherein the sensor is configured to convert the measured parameters into radio signals and transmit them to an evaluation device.

6. The means according to claim 1, wherein the second end portion is closed with an end cap that can be pulled off.

7. The means according to claim 1, wherein the means is configured as a lining element.

8. The means according to claim 1, wherein the means is configured as a calibrating tube.

9. A method for the rehabilitation of a connecting portion between a main pipeline and a branch pipeline, comprising the following steps:
   providing means for the rehabilitation of a connecting portion between a main pipeline and a branch pipeline with a main pipe section and a branch pipe section, wherein the main pipe section has a connecting region, wherein the branch pipe section is connected at its first end portion to the connecting region of the main pipe section, wherein the branch pipe section is closed at its second end portion, and wherein at least one contactless sensor is disposed within the means;
   transporting the means to the connecting portion to be rehabilitated;
   inverting, pressing and/or hardening of the means against the inner pipe wall by means of a medium;
   measuring physical parameters of the medium by means of the sensor; and
   transmitting the measured parameters to an evaluation device.

10. The method according to claim 9, wherein the sensor transmits the measured parameters to a receiver disposed on a rehabilitation device.

11. The method according to claim 10, wherein the receiver transmits the transmitted parameters to the evaluation device.

12. The method according to claim 9, wherein the measured parameters are stored on a storage medium.

13. A rehabilitation system for the rehabilitation of a connecting portion between a main pipeline and a branch pipeline, comprising:
   means for the rehabilitation of a connecting portion between a main pipeline and a branch pipeline with a main pipe section and a branch pipe section, wherein the main pipe section has a connecting region, wherein the branch pipe section is connected at its first end portion to the connecting region of the main pipe section, wherein the branch pipe section is closed at its second end portion and wherein at least one contactless sensor is disposed within the means, the at least one sensor operative to measure physical parameters of a medium flowing through the rehabilitation means;
   a rehabilitation device for transporting the rehabilitation means; and
   an evaluation device configured to receive the measured physical parameters from the at least one sensor.

* * * * *